C. R. DESILLES.
Dog-Muzzles.
No. 154,652. Patented Sept. 1, 1874.
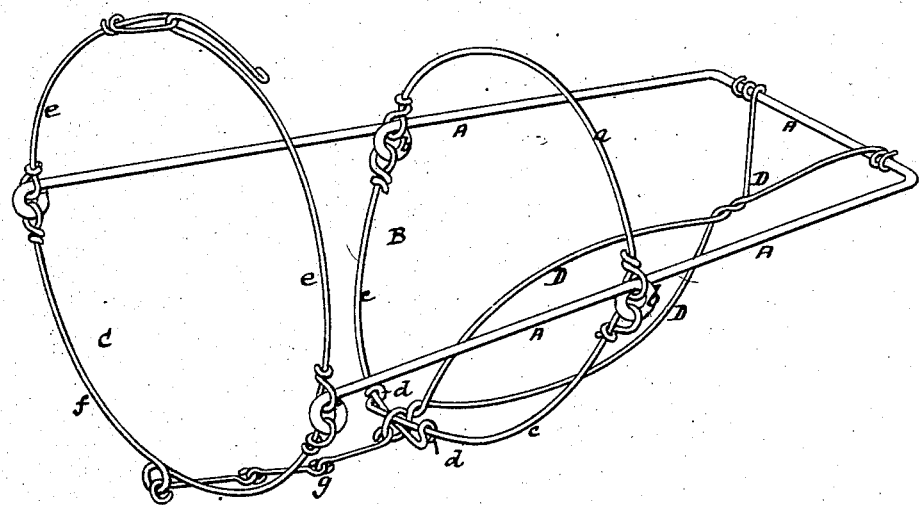
Witnesses.
Ewell Arick
W. E. Chaffee
Inventor
Charles Riballier Desilles
by atty A Pollok

UNITED STATES PATENT OFFICE.

CHARLES R. DESILLES, OF CHARLESTON, SOUTH CAROLINA.

IMPROVEMENT IN DOG-MUZZLES.

Specification forming part of Letters Patent No. 154,652, dated September 1, 1874; application filed August 19, 1874.

*To all whom it may concern:*

Be it known that I, CHARLES RIBALLIER DESILLES, of Charleston, South Carolina, have invented certain new and useful Improvements in Muzzles, of which the following is a specification:

It has been my object in the muzzle that I have invented to so construct it as to render it entirely comfortable to the animal to which it is applied, and to allow the animal to drink, breathe, bark, and, in fact, do everything with ease except bite.

The construction I have adopted also permits the muzzle, even if made wholly of metal or other stiff material, to be folded flat, so that it will occupy much less space, when packed in lots for transportation, than is the case with ordinary muzzles.

The nature of my invention and the manner in which the same is or may be carried into effect will be readily understood by reference to the accompanying drawing, which represents a perspective view of my improved muzzle.

The principal part of the muzzle is the front and side guard A, within the compass of which the animal's head is confined. This guard is in one piece of metal, or other rigid or stiff material, and passes along the sides and in front of the animal's head somewhat above the mouth. It is held in proper position by means of a head-ring, B, and a neck-ring, C. Both of these rings, in the present instance, are of wire, and they are made in two or more parts, jointed independently to the guard A in such manner that they adjust themselves with ease to the animal, and can also be folded up flat in the plane of the guard, for the purpose above stated. The head or nose ring is formed in three pieces. The upper half, *a*, is jointed to the guard by loops engaging eyes *b* on the guard. The under half is composed of two distinct pieces, *c*, jointed also to eyes *b* on the guard, and connected by loops or hook *d* at their contiguous ends, so that the one end will slide on the other. The lower half, thus composed of the two sections *c*, capable of being spread apart or drawn together, allows the dog to open his mouth, and at the same time permits the muzzle to be adjusted to different-sized heads. The throat-ring is in this instance also metal; but it may be of any other material, all that is required being a strap or band that will open to allow the animal's head to be inserted in the muzzle. After the head is thus inserted, the band can be fastened around the neck. This is accomplished, in the present instance, by making the upper half of the band in two pieces, *e*, united at their contiguous ends by a hook-and-eye fastening. The lower half, *f*, of the neck-ring, as well as the two parts of the upper half, are jointed to the guard A like the parts of the head or nose ring. The two rings B C are connected on the under side by a strap or chain, *g*, which renders it impossible for the animal to get rid of or to pull off the muzzle. Between the under part of the head or nose ring and the front part of the guard extends a brace, D, which serves to assist in assuring the guard in proper position, and also to prevent the animal from eating. This brace is jointed both to the nose-ring and to the guard. This bottom brace can, if desired, be dispensed with, in which case the animal would be able to eat, but still not bite.

It will be seen that the construction described renders every part of the muzzle movable, and so allows it to fit the animal comfortably and easily. All the parts can also be folded up so as to lie in the plane of the guard. A further advantage is the simplicity of structure and the very small expense of manufacture. It is also very light.

Having described my invention, what I claim, and desire to secure by Letters Patent, is—

1. The side and front guard, in combination with the nose or head and neck rings, and strap or chain connecting said rings, as and for the purposes shown and described.

2. In combination with the side and front guard, the nose or head ring having its lower half composed of two sections united by an expansible connection, substantially as described, to permit their spreading apart, for the purposes stated.

3. The combination of the side and front guard, the neck and head or nose rings, and the under brace and shield extending between the nose-ring and front of the guard, as shown and set forth.

4. A muzzle composed of a side and front guard, and jointed head and neck rings, with or without an under brace, constructed and arranged as described, so that the several parts of the muzzle may be folded up in the plane of the main side and front guard.

In testimony whereof I have hereunto signed my name this 17th day of August, A. D. 1874.

CHAS. RIBALLIER DESILLES.

Witnesses:
  O. E. JOHNSON, Jr.,
  W. W. JOHNSON.